(12) United States Patent
Schulz et al.

(10) Patent No.: US 8,873,421 B2
(45) Date of Patent: Oct. 28, 2014

(54) INTEGRATED TEST PACKET GENERATION AND DIAGNOSTICS

(71) Applicant: Oracle International Corporation, Redwood City, CA (US)

(72) Inventors: Jurgen M. Schulz, Pleasanton, CA (US); Rajnikanth Joshi, San Jose, CA (US)

(73) Assignee: Oracle International Corporation, Redwood City, CA (US)

( * ) Notice: Subject to any disclaimer, the term of this patent is extended or adjusted under 35 U.S.C. 154(b) by 143 days.

(21) Appl. No.: 13/747,665

(22) Filed: Jan. 23, 2013

(65) Prior Publication Data

US 2014/0204774 A1    Jul. 24, 2014

(51) Int. Cl.
*H04L 12/26* (2006.01)
*H04L 12/54* (2013.01)

(52) U.S. Cl.
CPC ............ *H04L 43/50* (2013.01); *H04L 12/2697* (2013.01); *H04L 12/5693* (2013.01)
USPC ............................ 370/252; 375/224; 379/1.01

(58) Field of Classification Search
CPC ... H04L 1/24; H04L 12/5693; H04L 12/2697; H04L 12/26; H04L 43/50; H04L 43/087; H04L 43/0829
USPC ................... 370/244–350; 375/224; 379/1.01
See application file for complete search history.

(56) References Cited

U.S. PATENT DOCUMENTS

| | | | |
|---|---|---|---|
| 7,768,930 B1* | 8/2010 | Scholte | 370/244 |
| 7,848,245 B1* | 12/2010 | Krishnamurthy et al. | 370/244 |
| 2003/0172177 A1* | 9/2003 | Kersley et al. | 709/236 |
| 2007/0168748 A1* | 7/2007 | Musoll | 714/38 |
| 2010/0183021 A1* | 7/2010 | Cloonan et al. | 370/412 |

OTHER PUBLICATIONS

Document 01302978.pdf "Diagnostic for Causes of Packet Loss in a High Performance Data Transfer System" Dicken et al. IEEE, (Proceedings of the 18$^{th}$ International Parrallel and Distributed Processing Symposium (IPDPS 2004).*

* cited by examiner

*Primary Examiner* — Afsar M Qureshi
(74) *Attorney, Agent, or Firm* — Marsh Fischmann & Breyfogle LLP; Kent A. Lembke (57) ABSTRACT

Systems, methods, and apparatus for generating data packets and testing a packet switching system are provided. For example, a data packet diagnostic system includes an input queuing subsystem comprising a set of data queues, an injecting unit, and a diagnostic unit. Each data queue is coupled with a separate functional read/write path and debug read/write path. The injecting unit injects test data packets into at least one of the data queues via its respective debug read/write path. The test packets can then be processed (e.g., routed) through a data packet processing environment. In some implementations, packets are communicated via the data packet processing environment back to the input queuing subsystem, where the diagnostic unit can read present contents of at least one of the data queues to determine whether the present contents satisfy a predetermined test profile according to the injected data packets.

20 Claims, 7 Drawing Sheets

INTEGRATED TEST PACKET GENERATION AND DIAGNOSTICS

BACKGROUND

1. Field of the Disclosure

The present disclosure generally relates to packet generation and diagnostics, and more particularly, to systems and methods for test packet generation and diagnostics integrated into circuitry of a packet switching system.

2. Relevant Background

The functionality of integrated circuits such as passive switch chips, passive RFID (radio frequency identification) chips, and memory controllers, to name a few, may be tested before being sold to an external party and/or before being used with a larger system. Testing the functionality may include testing for at least data packet corruption and/or data packet loss. Typically, these types of integrated circuits are not capable of generating packets for testing and are dependent upon receiving packets from an external source, e.g., a CPU (central processing unit). Testing functionality of the integrated circuits absent a CPU can involve the use of external test equipment to generate packets for insertion into passive circuitry. For example, complex test systems and/or various types of logic circuitry (e.g., FPGAs (Field Programmable Gate Arrays)) can be configured to simulate operation of a CPU in a test environment. However, these techniques are often expensive and cumbersome, have limited compatibility with various types of circuitry, have limitations on test speeds, limit the ability to test the circuitry inside its intended operating environment, etc.

SUMMARY

Systems and methods are provided for data packet generation and diagnostics of a packet switching system. Some embodiments operate in context of a data packet switching environment, in which a packet switching system channels incoming data flow from a plurality of input data ports to an output port appropriate for its destination. Some implementations include a data packet diagnostic system that can be interconnected with various components of the data packet switching system. For example, the packet switching system includes a number of passive data queues configured so that, during functional (normal) operation, data packets can be received into each data queue via a respective functional read/write path. Each data queue is also in communication with the data packet diagnostic system via a respective debug read/write path that is separate from its functional read/write path. The data packet diagnostic system can inject test data packets into the data queues via the debug read/write paths. In this way, the otherwise passive packet switching system can generate and/or diagnose its own test packets without subjecting the switching system to a normal functional environment or to an active, external test environment.

A data packet diagnostic system may include an input queuing subsystem with a set of data queues, each coupled with a functional read/write path and a debug read/write path. Each data queue receives data via its respective functional read/write path when the input queuing subsystem operates in a functional mode and each data queue receives data via its respective debug read/write path when the input queuing subsystem operates in a test mode. The data packet diagnostic system may also include an injecting unit operable to inject data packets into at least one data queue of the input queuing subsystem via its respective debug read/write path when the input queuing subsystem operates in the test mode. The data packet diagnostic system may further include a diagnostic unit operable to read present contents of at least one data queue of the input queuing subsystem and determine whether the present contents satisfy a predetermined test profile according to the injected data packets.

In another approach, a data packet diagnostic system may include an input queuing subsystem, an injecting unit, a switching subsystem, an output queuing subsystem, and a diagnostic unit. The input queuing subsystem includes a set of data queues, each coupled with a functional read/write path and a debug read/write path. Each data queue receives data via its respective functional read/write path when the input queuing subsystem operates in a functional mode and each data queue receives data via its respective debug read/write path when the input queuing subsystem operates in a test mode. The injecting unit is operable to inject data packets into at least one data queue of the input queuing subsystem via its respective debug read/write path when the input queuing subsystem operates in the test mode. The switching subsystem is operable to re-route the data packets from the input queuing subsystem through a data packet processing environment. The output queuing subsystem is operable to send the data packets to at least one data queue of the input queuing subsystem via its respective functional read/write path. The diagnostic unit is operable to read present contents of at least one data queue of the input queuing subsystem and determine whether the present contents satisfy a predetermined test profile according to the injected data packets.

Methods of injecting data packets for use in testing a packet switching system are provided. In one embodiment, a method may include injecting data packets into at least one data queue of an input queuing subsystem via a debug read/write path, where the at least one data queue is coupled with a functional read/write path and the debug read/write path. The method may also include releasing the data packets from the at least one data queue of the input queuing subsystem via its respective functional read/write path into a data packet processing environment in response to receiving a release signal at the queuing subsystem. The method may further include receiving the data packets at the at least one data queue of the input queuing subsystem via its respective functional read/write path when the data packets are processed by the data packet processing environment. The method may further include reading present contents of the at least one data queue of the input queuing subsystem at a diagnostic unit. The method may further include determining whether the present contents satisfy a predetermined test profile according to the injected data packets.

In addition to the aspects and embodiments described above, further aspects and embodiments will become apparent by reference to the drawings and by study of the following descriptions.

DETAILED DESCRIPTION

The present disclosure generally relates to packet generation and diagnostics of a packet switching system (e.g., an integrated circuit). The functionality of integrated circuits may be tested with a variety of techniques. The existing techniques typically require an external source for packet generation, which may be expensive or otherwise undesirable. Accordingly, embodiments described herein include a packet switching system with a data packet diagnostic subsystem for packet generation and diagnostics of the packet switching system. The packet switching system includes an input queuing subsystem with a set of data queues, each coupled with a functional read/write path and a debug read/write path. The data packet diagnostic subsystem may inject the data packets into the data queues via the debug read/write path for temporary storage according to a predetermined test profile. The data packet diagnostic subsystem may further determine whether present contents (e.g., data packets processed and/or re-routed through the packet switching environment) of the data queues satisfy the predetermined test profile according to the injected data packets.

Figure 1:
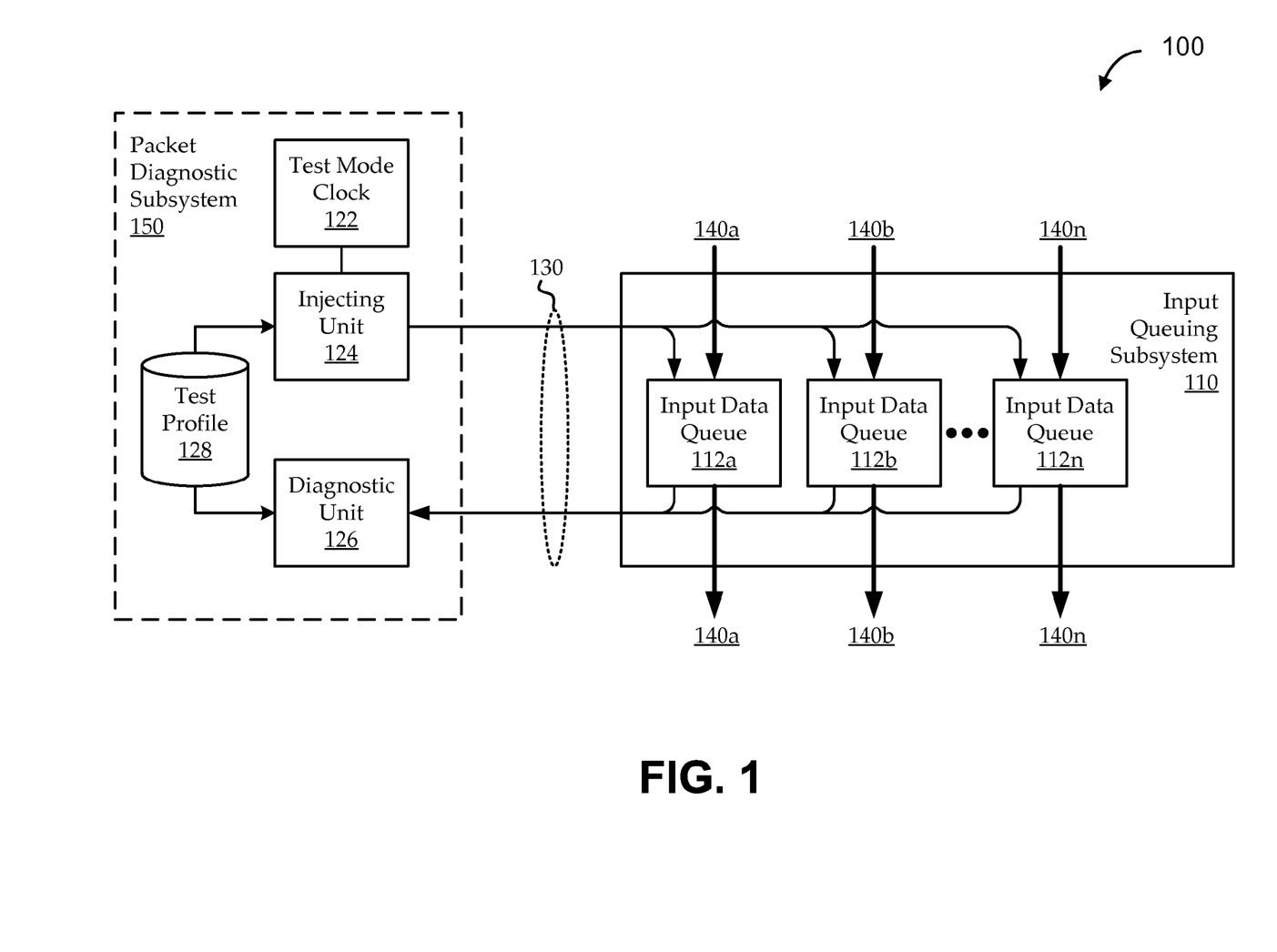
FIG. 1 is a block diagram illustrating a data packet diagnostic system for injecting data packets and testing a packet switching system.

FIG. 1 shows a simplified block diagram 100 of an illustrative data packet diagnostic subsystem 150 and input queuing subsystem 110, according to various embodiments. The data packet diagnostic subsystem 150 includes a test mode clock 122, an injecting unit 124, a diagnostic unit 126, a predetermined test profile 128, and a debug read/write path 130. The data packet diagnostic subsystem 150 may be operable to inject data packets into an input queuing subsystem 110, read present contents of the input queuing subsystem 110, and determine whether the present contents satisfy the predetermined test profile 128 according to the injected data packets. As such, the debug read/write path 130 may facilitate communications between the data packet diagnostic subsystem 150 and the input queuing subsystem 110. The input queuing subsystem 110 may facilitate temporary storage of data packets. For example, the input queuing subsystem 110 may be operable to receive data packets and store the data packets until the input queuing subsystem 110 is instructed to release the data packets. In this regard, the input queuing subsystem 110 may include a memory device such as a First In/First Out buffer. As used herein, any reference to a queue and/or a buffer is used to mean a device for the temporary storage of data.

The input queuing subsystem 110 and the data packet diagnostic subsystem 150 may be at the same location or may be located at different locations relative to one another. The input queuing subsystem 110 and the data packet diagnostic subsystem 150 may be separate components or may be integral with one another and/or other components of an integrated circuit, for example. In other words, the queuing subsystem 110 and the data packet diagnostic subsystem 150 may be in any arrangement suitable such that data packets may be generated independent of any external equipment and a packet switching system may be tested for at least corruption and/or packet loss with the generated data packets. For example, the input queuing subsystem 110 can be implemented as a single integrated circuit that includes both the input queuing subsystem 110 and the data packet diagnostic subsystem 150. Alternatively, the input queuing subsystem 110 can be implemented as an integrated circuit in communication via ports or other communication paths with one or more components that provide functionality of the data packet diagnostic subsystem 150.

As illustrated, the input queuing subsystem 110 includes a set of data queues $112_A$-$112_N$. Each data queue 112 may be coupled with a functional read/write path 140 and a debug read/write path 130. The functional read/write path 140 may be utilized when the input queuing subsystem 110 operates in a functional mode. The input queuing subsystem 110 may operate in a functional mode when the input queuing subsystem 110 is utilized in an operational environment and/or in a simulation environment. For example, as noted above, the input queuing subsystem 110 may be part of an integrated circuit, such as a passive switch chip, which may be designed to channel incoming data flow from a plurality of input data ports to an output port appropriate for its destination. When the input queuing subsystem 110 operates in its functional mode, each data queue 112 may receive data via its respective functional read/write path 140 and store the data until each data queue 112 is instructed to release the data packets.

Alternatively, the debug read/write path 130 may be utilized when the input queuing subsystem 110 operates in a test mode. The input queuing subsystem 110 may operate in a test mode when the input queuing subsystem 110 is utilized for testing the functionality of the input queuing subsystem 110. For example, before the input queuing subsystem 110 operates in its functional mode, the input queuing subsystem 110 may operate in its test mode while data packets are injected into the input queuing subsystem 110 before testing the functionality of the input queuing subsystem 110. In one example, when the input queuing subsystem 110 operates in its test mode each data queue 112 may receive data via its respective debug read/write path 130 and store the data until each data queue 112 is instructed to release the data packets. In another example, when the input queuing subsystem 110 operates in its test mode, one data queue (e.g., $112_A$) may receive data via its respective debug read/write path 130 and store the data unit it is instructed to release the data packets. In other words, any number of data queues 112 may receive data via its respective debug read/write path 130 and store the data when the input queuing subsystem 110 operates in its test mode. The test mode may or may not include the input queuing subsystem 110 operating in a test environment.

As discussed above, the data packet diagnostic subsystem 150 may include a test mode clock 122, an injecting unit 124, and a diagnostic unit 126. The injecting unit 124 may be operable to inject data packets into at least one data queue 112 of the input queuing subsystem 110 via its respective debug read/write path 130 when the input queuing subsystem 110 operates in the test mode. The injecting unit 124 may be one or more registers (e.g., a control and status register) of a CPU, for example. The debug read/write path 130 may be configured to receive data packets at a debug clock rate. For example, the test mode clock 122 may send a debug clock signal to the injecting unit 124 such that the injecting unit 124 injects the data packets into at least one data queue 112 of the input queuing subsystem 110 via its respective debug read/write path 130 at the debug clock rate. As such, the input queuing subsystem 110 may operate at the debug clock rate in the test mode. The injecting unit 124 may inject data packets into at least one data queue 112 of the input queuing subsystem 110 via its respective debug read/write path 130 in response to receiving a write signal.

The input queuing subsystem 110 may be configured to operate in its functional mode after each data queue 112 receives and stores the data packets received from the injecting unit 124. The input queuing subsystem 110 may be configured to operate at a functional clock rate in the functional mode. For example, a functional mode clock (e.g., a system clock or other clock integrated with or external to the data packet diagnostic subsystem 150 and/or the input queuing subsystem 110 (not shown)) may send a functional clock signal to the input queuing subsystem 110 such that the input queuing subsystem 110 operates at the functional clock rate. As such, the functional read/write path 140 may be configured to receive data packets at the functional clock rate. In one embodiment, the debug clock rate is slower than the functional clock rate. In one embodiment, the debug clock rate is faster than the functional clock rate.

The input queuing subsystem 110 and/or the data packet diagnostic subsystem 150 may be part of a packet switching system, where the packet switching system includes a data packet processing environment. As noted above, each data queue 112 may receive data via its respective debug read/write path 130 and store the data until each data queue 112 is instructed to release the data packets. Each data queue 112 may be instructed to release the data packets in response to receiving a release signal. The data packets stored in each data queue 112 may be released via each data queues respective functional read/write path 140 into the data packet processing environment at the functional clock rate when the release signal is received. The data packets may be re-routed to each data queue 112 while being processed through the data packet processing environment. In this regard, the data packets re-routed to each data queue 112 may be read by the diagnostic unit 126, which will be described more fully below. The packet switching system may include one or more components of the data packet diagnostic subsystem 150 and/or the input queuing subsystem 110.

Figure 2:
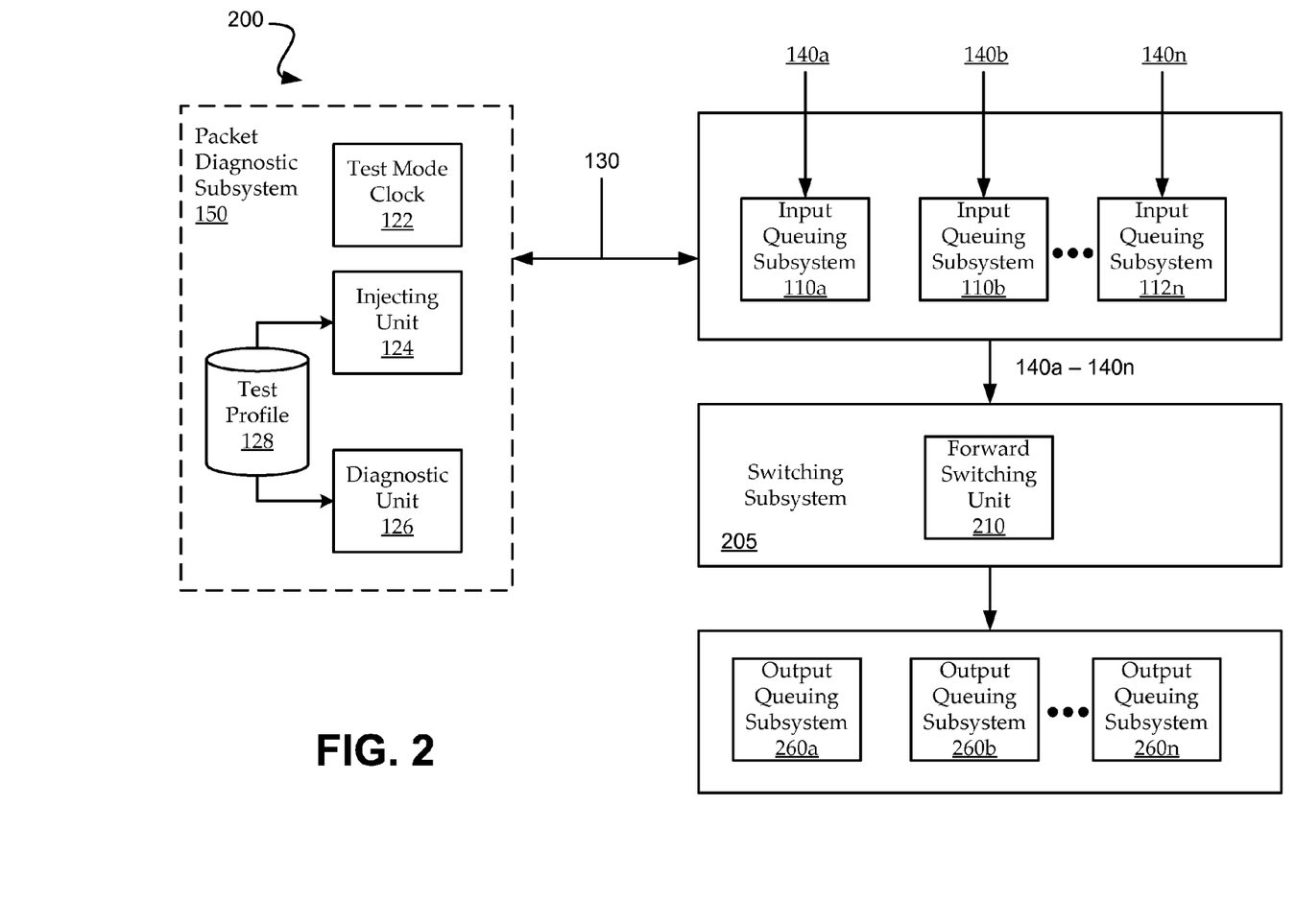
FIG. 2 is a block diagram illustrating additional components of the data packet diagnostic system of FIG. 1.

FIG. 2 shows one embodiment of a packet switching system 200. The packet switching system 200 may include one or more data packet diagnostic subsystems 150, one or more input queuing subsystems 110, a switching subsystem 205, and one or more output queuing subsystems 260. As the packet switching system 200 processes data packets, the switching subsystem 205 may be operable to start and stop the flow of data packets. For example, the switching subsystem 205 may send each data queue 112 in the input queuing subsystem 110 the release signal to start the flow of data packets through the data packet processing environment. In another example, the switching subsystem 205 may send each data queue 112 in the input queuing subsystem 110 a halt signal to stop the flow of data packets through the data packet processing environment. Additionally, the switching subsystem 205 may be operable to re-route data packets from the input queuing subsystem 110 to the output queuing subsystem 260 (e.g., output data queues) via the data packet processing environment.

The switching subsystem 205 may include a forward switching unit 210. The forward switching unit 210 may be operable to receive data packets from the set of input queuing subsystems $110_A$-$110_N$ and send the data packets to the set of output queuing subsystems $260_A$-$260_N$. The switching subsystem 205 may further include routing tables and/or other functionality for facilitating packet routing and related functionality. For example, the packet switching subsystem 200 re-routes the data packets from the set of input queuing subsystems $110_A$-$110_N$ to the set of output queuing subsystems $260_A$-$260_N$ based on information contained within the routing table that indicates to the switching subsystem 205 which data packets received from each input queuing subsystem 110 should be sent to which output queuing subsystem 260. Information contained within the routing table may also indicate which input queuing subsystem 110 should receive the data packet from each output queuing subsystem 260, e.g., by tagging a data packet in a packet header with an appropriate address. The routing table may include any number of combinations for re-routing data packets from the set of input queuing subsystems $110_A$-$110_N$ to the set of output queuing subsystems $260_A$-$260_N$. Such combinations may facilitate the complete testing of the functionality of the packet switching system 200.

Figure 3:
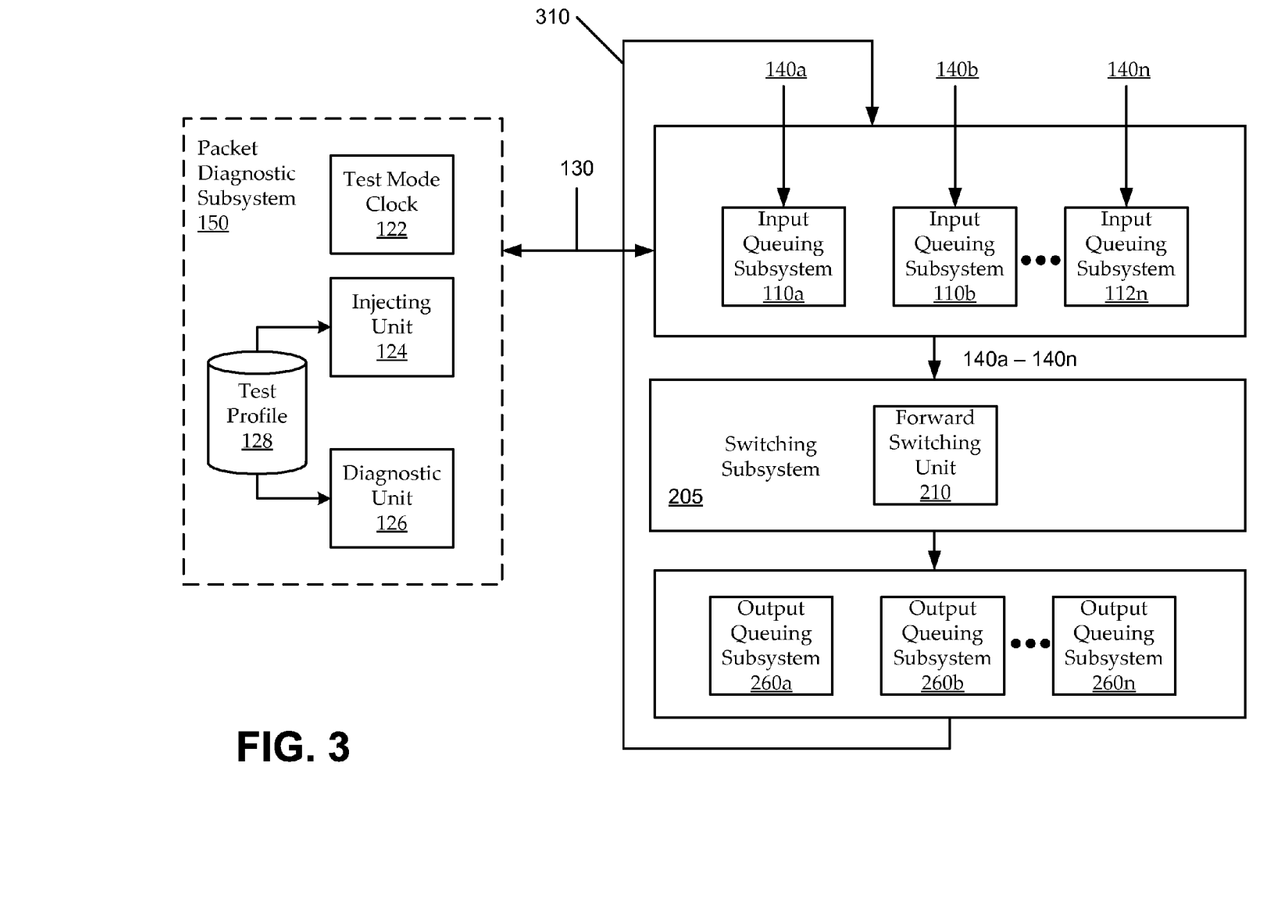
FIG. 3 is a block diagram illustrating a respective read and write connection that may be established between components of the data packet diagnostic system.

FIG. 3 shows one embodiment of the packet switching system 200 including a loopback path 310. In this regard, the routing table may additionally include information for routing data packets via the loopback path 310 from the set of output queuing subsystems $260_A$-$260_N$ back to the functional read/write path 140 of each data queue 112 of the input queuing subsystem 110. The loopback path 310 may be a wire and/or cable, for example. The loopback path 310 may connect one output queuing subsystem 260 with one input queuing subsystem 110. For example, loopback path 310 may be connected to an output port of the output queuing subsystem 260 and connected to an input port (e.g., the functional read/write path 140) of the input queuing subsystem 110 such that data packets leaving the output queuing subsystem 260 are re-routed to the input queuing subsystem 110.

Referring back to FIG. 1, the data packet diagnostic subsystem 150 may include a diagnostic unit 126. The diagnostic unit 126 may be operable to read present contents of at least one data queue 112 of the queuing subsystem 110 and determine whether the present contents satisfy a predetermined test profile 128 according to the injected data packets. The predetermined test profile 128 may define the data packets injected into the at least one data queue 112 of the input queuing subsystem 110 and the expected contents of the at least one data queue 112 of the input queuing subsystem 110 after the data packets are received at the input queuing subsystem 110 from the data packet processing environment. For example, as discussed above, after the data packets are injected into each data queue 112 of the input queuing subsystem 110, the data packets are stored until a release signal is received. When the release signal is received the data packets may be processed through the data packet processing environment at the functional clock speed. In turn, the data packets may be re-routed to each data queue 112 via its respective functional read/write path 140. As such, the present contents of the at least one data queue 112 of the input queuing subsystem 110 may be data packets that have been processed by the data packet processing environment.

Figure 4:
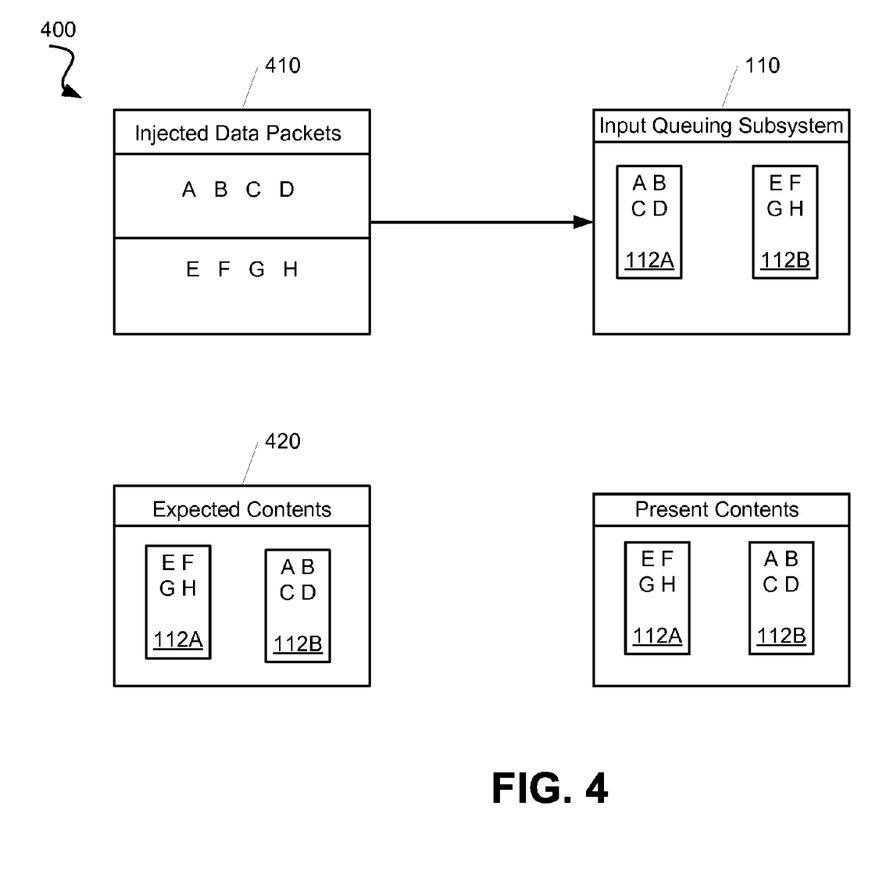
FIG. 4 is a schematic view illustrating one example of a predetermined test profile.

There are various ways the present contents of the at least one data queue 112 of the queuing subsystem 110 may satisfy a predetermined test profile. In one example, a predetermined test profile 400 is illustrated in FIG. 4. The predetermined test profile 400 includes injected data packets 410 and expected contents 420. The predetermined test profile 400 may be satisfied if the present contents are equivalent to the expected contents 420 according to the injected data packets 410. For example, the injected data packets should be routed such that the injected data packets arrive at an appropriate destination (e.g., the expected contents of the at least one data queue 112) after the data packets have been processed by the data packet processing environment. In this example, the injected data packets 410 include A, B, C, and D and E, F, G, and H. Data packets A, B, C, and D are injected into data queue $112_A$ and data packets E, F, G, and H are injected into data queue $112_B$. As defined in the predetermined test profile 400, after injected data packets A, B, C, D, E, F, G, and H are processed through the data packet processing environment (e.g., the data packets are routed and/or switched through the switching subsystem 205 and/or the output queuing subsystem 260 of FIG. 2), the expected contents of the data queue $112_A$ are E, F, G, and H and the expected contents of the data queue $112_B$ are A, B, C, and D. In this example, if the present contents of data queue $112_A$ are E, F, G, and H, the predetermined test profile 400 is satisfied. Likewise, if the present contents of data queue $112_B$ are A, B, C, and D, the predetermined test profile 400 is satisfied.

The present contents of the at least one data queue 112 of the queuing subsystem 110 may satisfy a predetermined test profile in other ways. In one embodiment, the predetermined test profile is characterized such that the expected contents of the at least one data queue 112 are the same as the data packets injected into the at least one data queue 112. For example, after the injected data packets are processed by the data packet processing environment, the appropriate destination of the injected data packets may be the same data queue 112 where the data packets were initially injected.

The data packets may be processed through the data packet processing environment such that each data packet passes through each input queuing subsystem $110_A$-$110_N$ and each output queuing subsystem $260_A$-$260_N$ at least once and in any combination. The diagnostic unit 126 may read present contents of the at least one data queue 112 of the input queuing subsystem 110 at any time while the data packet diagnostic subsystem 150 is in its functional mode. The diagnostic unit 126 may read present contents of the at least one data queue 112 of the input queuing subsystem 110 via its respective debug read/write path 130. The diagnostic unit 126 may also read present contents of at least one output data queue (not shown) of the output queuing subsystem 260. In one example, the set of output queuing subsystems $260_A$-$260_N$ may be in a single stepped mode. The single stepped mode may facilitate reading of one data packet at a time via the diagnostic unit 126. After each data packet is read, the data packet is sent to a data queue 112 of the input queuing subsystem 110 via the loopback path 310 and a subsequent data packet is made available for reading.

The diagnostic unit 126 may help facilitate testing the functionality of the data packet diagnostic subsystem 150 by determining whether the present contents satisfy a predetermined test profile 128 according to the injected data packets. In this regard, corruption may be identified if any of the present contents don't satisfy the predetermined test profile 128 according to the injected data packets and/or if data packets are lost at any point during processing by the data packet diagnostic subsystem 150.

Figure 5:
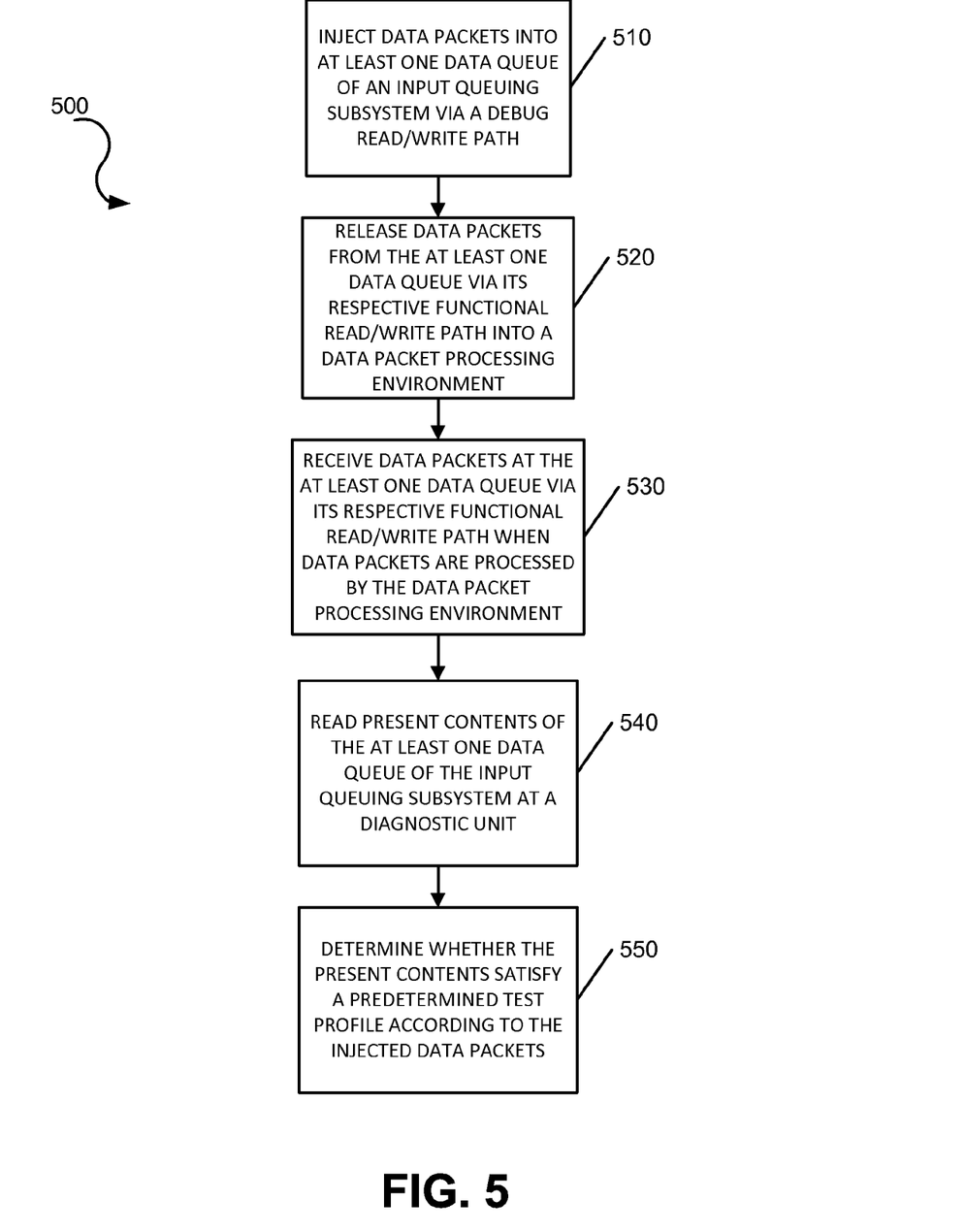
FIG. 5 is a flow diagram illustrating steps that may be performed for injecting data packets and testing a packet switching system.

FIG. 5 shows methods relating to injecting data packets for use in testing a packet switching system. In one embodiment, a method 500 includes the steps of injecting data packets into at least one data queue of an input queuing subsystem via a debug read/write path 510, and releasing the data packets from the at least one data queue of the input queuing subsystem via its respective functional read/write path into a data packet processing environment in response to receiving a release signal at the input queuing subsystem 520. For example, test data packets are formulated according to a predetermined test profile and sent into a FIFO buffer (e.g., a data queue) via a debug read/write path for temporary storage. The FIFO buffer releases the test data packets upon receiving a release instruction such that the data packets are processed through a packet switching system (e.g., a data packet processing environment).

As the data packets are processed by the packet switching system, the method 500 may further include receiving the data packets at the at least one data queue of the input queuing subsystem via its respective functional read/write path 530, reading present contents of the at least one data queue of the input queuing subsystem at a diagnostic unit 540, and determining whether the present contents satisfy a predetermined test profile according to the injected data packets 550. For example, the data packets are processed by a switching subsystem and an output queuing subsystem, where the data packets are eventually sent back to at least one data queue of the input queuing unit. As discussed above, the test data packets are formulated according to a predetermined test profile. As such, after the data packets are processed by the packet switching system, the data packets are processed by a diagnostic unit configured to determine whether the present contents of the at least one data queue satisfy the predetermined test profile. For example, the present contents of the at least one data queue are compared to the expected contents of the at least one data queue. The expected contents are the data packets expected to be in the at least one data queue according to the predetermined test profile after being re-routed by the packet switching system. In turn, the packet switching system is tested for corruption and/or data packet loss.

Figure 6:
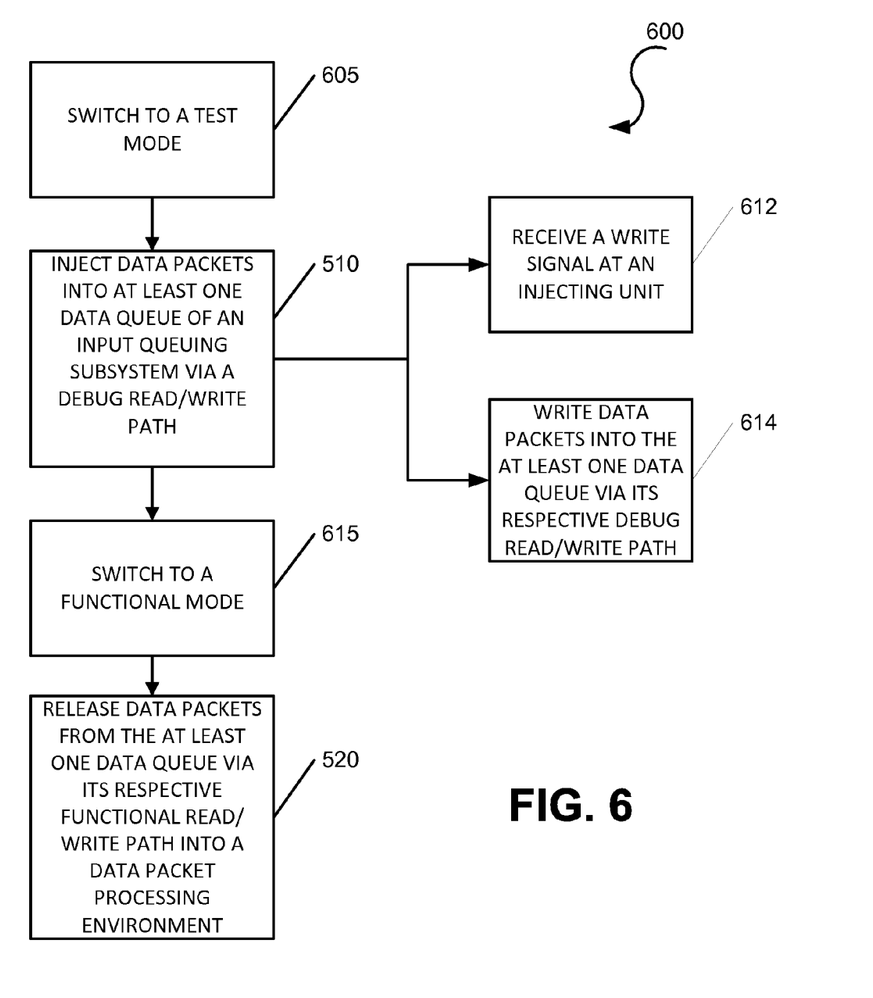
FIG. 6 is a flow diagram illustrating additional steps that may be performed for injecting data packets and testing a packet switching system.

FIG. 6 shows a method relating to injecting data packets in the context of a test mode or functional mode. A method 600 may include the steps of switching to a test mode 605 and switching to a functional mode 515. For example, the injecting data packets into at least one data queue of an input queuing subsystem via a debug read/write path step 510 may be performed after switching to a test mode 605. The test mode facilitates injection of data packets via the debug read/write path at a debug clock rate. The injecting data packets into at least one data queue of an input queuing subsystem via a debug read/write path step 510 may include receiving a write signal at an injecting unit 612 and writing the data packets serially into the at least one data queue of the input queuing subsystem via its respective debug read/write path when the input queuing subsystem is operating at the debug clock rate 614. The debug read/write path is utilized to diagnose the packet switching system. As such, data packets are injected via the debug read/write path at a speed according to the debug read/write path specifications (e.g., the debug clock rate). Accordingly, the injecting unit and the input queuing subsystem are switched to a test mode.

In another example, the releasing the data packets from the at least one data queue of the input queuing subsystem via its respective functional read/write path into a data packet processing environment in response to receiving a release signal at the input queuing subsystem step 520 may be performed after switching to a functional mode 615. The functional mode facilitates processing the data packets, after injection, through the packet switching system at an operational speed of the packet switching system. In other words, the data packets may be processed via the functional read/write path at a speed greater than the debug read/write path may process the data packets. In this regard, after the data packets are injected into the at least one data queue the packet switching system is switched to a functional mode.

Figure 7:
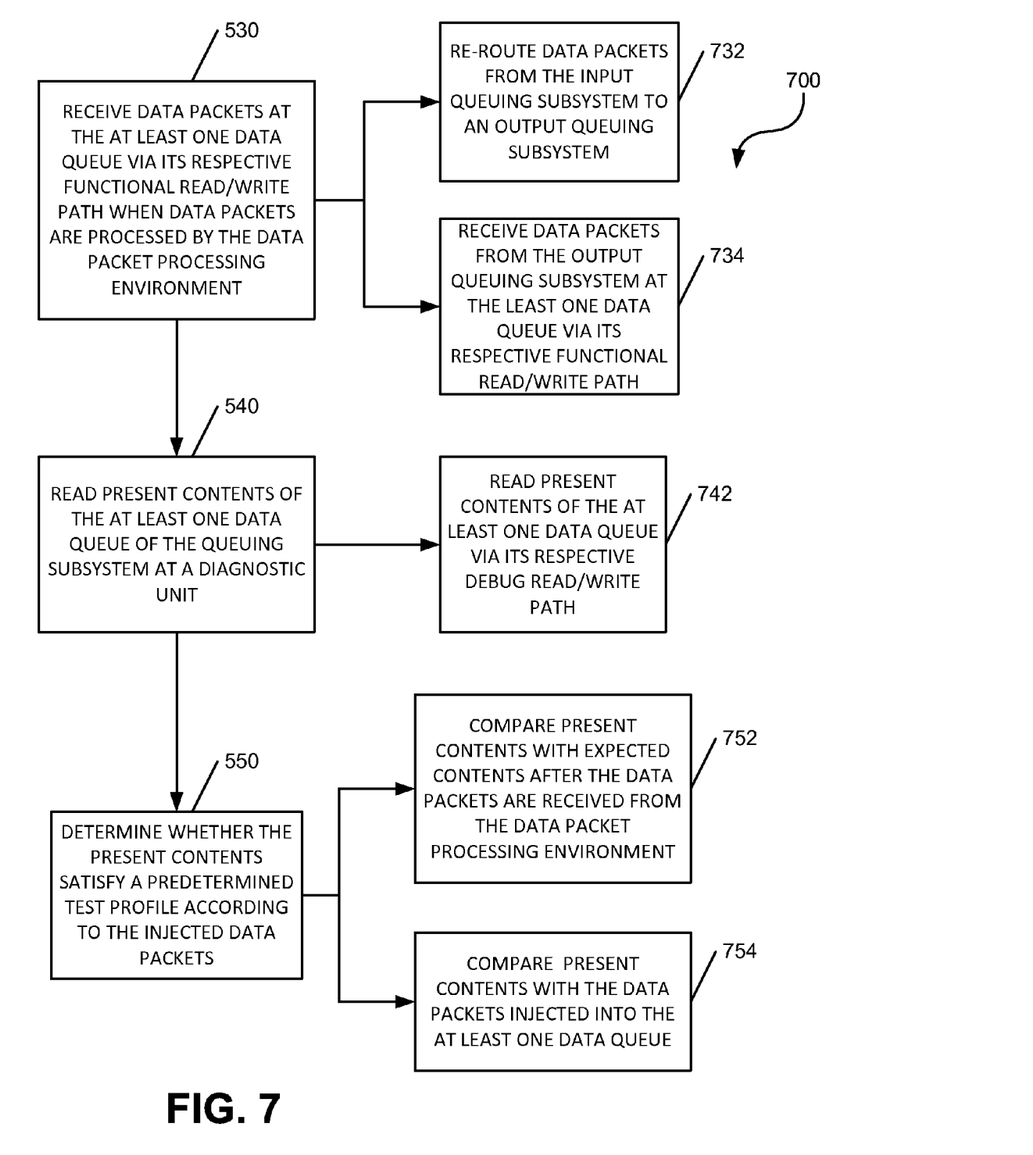
FIG. 7 is a flow diagram illustrating additional steps that may be performed for injecting data packets and testing a packet switching system.

FIG. 7 shows additional steps performed in testing a packet switching system. A method 700 may include the steps of re-routing the data packets from the input queuing subsystem to an output queuing subsystem via the data packet processing environment 732 and receiving the data packets from the output queuing subsystem at the at least one data queue of the input queuing subsystem via its respective functional read/write path 734. For example, the receiving the data packets at the at least one data queue of the input queuing subsystem via its respective functional read/write path step 530 may include steps 732 and 734. In one embodiment, the data packets are re-routed according to a routing table. For example, a switching subsystem receives the data packets from the at least one data queue and re-routes the packets to an output queuing subsystem according to the routing table (e.g., the routing table may indicate that a data packet coming from data queue A should be sent to output queuing subsystem B). The data packets are sent back to at least one data queue of the input queuing subsystem via a loopback path (e.g., a wire or cable connecting the output queuing subsystem to the at least one data queue). The method 700 may also include the step of reading present contents of the at least one data queue of the input queuing subsystem via its respective debug read/write path 742. For example, each data packet presently stored in the at least one data queue is sent to a diagnostic unit in communication with the at least one data queue via it's respective debug read/write path such that the data packets are sent at the debug clock rate.

The method 700 may further include the step of comparing the present contents of the at least one data queue of the input queuing subsystem with the expected contents of the at least one data queue of the input queuing subsystem after the data packets are received at the input queuing subsystem from the data packet processing environment as defined in the predetermined test profile 752. The method 700 may also or alternatively include the step of comparing the present contents of the at least one data queue of the input queuing subsystem with the data packets injected into the at least one data queue of the input queuing subsystem as defined in the predetermined test profile 754. For example, the predetermined test profile defines the characteristics of the injected data packets and the data packets expected at a data queue after the data packets have been processed by the data packet processing environment. As such, by comparing the present contents (e.g., the presently stored data packets) of the at least one data queue with the expected contents of the at least one data queue as defined by the predetermined test profile it can be determined whether the present contents satisfy the predetermined test profile. In turn, the packet switching system is tested for corruption and/or data packet loss.

It will be readily appreciated that many deviations may be made from the specific embodiments disclosed in the specification without departing from the spirit and scope of the present described technology. Also, it should be understood that the functionalities performed by many of the processes and subsystems discussed herein may be performed by other subsystems, processes, etc. The illustrations and discussion herein has only been provided to assist the reader in understanding the various aspects of the present disclosure. Furthermore, one or more various combinations of the above discussed arrangements and embodiments are also envisioned.

Embodiments disclosed herein can be implemented as one or more computer program products, i.e., one or more modules of computer program instructions encoded on a computer-readable medium for execution by, or to control the operation of, data packet diagnostic apparatus. The computer-readable medium can be a machine-readable storage device, a machine-readable storage substrate, a memory device, a composition of matter affecting a machine-readable propagated signal, or a combination of one or more of them.

A computer program (also known as a program, software, software application, script, or code) used to provide the functionality described herein can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes described in this specification can be performed by one or more programmable processors executing one or more computer programs to perform functions by operating on input data and generating output. The processes can also be performed by, and apparatus can also be implemented as, special purpose logic circuitry, e.g., an ASIC (application-specific integrated circuit). Processors suitable for the execution of a computer program may include, by way of example, both general and special purpose microprocessors, and any one or more processors of any kind of digital computer. Generally, a processor will receive instructions and data from a read-only memory or a random access memory or both. Generally, the elements of a computer are one or more processors for performing instructions and one or more memory devices for storing instructions and data. The techniques described herein may be implemented by a computer system configured to provide the functionality described. Furthermore, the flow diagrams disclosed herein have merely been presented as examples of manners in which the present teachings can be implemented and do not in all cases necessarily require all the disclosed steps and/or the particular order in which the steps have been presented.

In different embodiments, the data packet processing environment may include one or more of various types of integrated circuits for use with various types of devices, including, but not limited to a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

While this disclosure contains many specifics, these should not be construed as limitations on the scope of the disclosure or of what may be claimed, but rather as descriptions of features specific to particular embodiments of the disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

What is claimed is:

1. A data packet diagnostic system comprising:
    an input queuing subsystem comprising a set of data queues, each coupled with a functional read/write path and a debug read/write path, wherein each data queue receives data via its respective functional read/write path when the input queuing subsystem operates in a functional mode and each data queue receives data via its respective debug read/write path when the input queuing subsystem operates in a test mode;
    an injecting unit operable to inject data packets into at least one data queue of the input queuing subsystem via its respective debug read/write path when the input queuing subsystem operates in the test mode; and
    a diagnostic unit operable to read present contents of at least one data queue of the input queuing subsystem and determine whether the present contents satisfy a predetermined test profile according to the injected data packets.

2. The diagnostic system of claim 1, wherein the diagnostic unit reads present contents of the at least one data queue of the input queuing subsystem via its respective debug read/write path.

3. The diagnostic system of claim 1, wherein the input queuing subsystem operates at a debug clock rate in the test mode, and at a functional clock rate in the functional mode.

4. The diagnostic system of claim 3, wherein the debug clock rate is slower than the functional clock rate.

5. The diagnostic system of claim 3, wherein the injector injects the data packets serially into the at least one data queue of the input queuing subsystem via its respective debug read/write path at the debug clock rate in response to receiving a write signal.

6. The diagnostic system of claim 1, wherein the data packets are released from the at least one data queue of the input queuing subsystem via its respective functional read/write path into a data packet processing environment at the functional clock rate in response to receiving a release signal.

7. The diagnostic system of claim 6, further comprising:
    a switching subsystem operable to re-route the data packets from the input queuing subsystem to an output queuing subsystem via the data packet processing environment.

8. The diagnostic system of claim 6, wherein the predetermined test profile defines the data packets injected into the at least one data queue of the input queuing subsystem and the expected contents of the at least one data queue of the input queuing subsystem after the data packets are received at the input queuing subsystem from the data packet processing environment.

9. A method of injecting data packets for use in testing a packet switching system, the method comprising:
    injecting data packets into at least one data queue of an input queuing subsystem via a debug read/write path, wherein the at least one data queue is coupled with a functional read/write path and the debug read/write path;
    releasing the data packets from the at least one data queue of the input queuing subsystem via its respective functional read/write path into a data packet processing environment in response to receiving a release signal at the queuing subsystem;
    receiving the data packets at the at least one data queue of the input queuing subsystem via its respective functional read/write path when the data packets are processed by the data packet processing environment;
    reading present contents of the at least one data queue of the input queuing subsystem at a diagnostic unit; and
    determining whether the present contents satisfy a predetermined test profile according to the injected data packets.

10. The method of claim 9, further comprising:
    switching to a test mode before performing the injecting step; and
    switching to a functional mode before performing the releasing step.

11. The method of claim 10, wherein the input queuing subsystem operates at a debug clock rate in the test mode and a functional clock rate in the functional test mode.

12. The method of claim 9, wherein the injecting step comprises:
    receiving a write signal at an injecting unit; and
    writing the data packets serially into the at least one data queue of the input queuing subsystem via its respective debug read/write path when the input queuing subsystem is operating at the debug clock rate.

13. The method of claim 9, wherein the receiving step comprises:
    re-routing the data packets from the input queuing subsystem to an output queuing subsystem via the data packet processing environment; and
    receiving the data packets from the output queuing subsystem at the least one data queue of the input queuing subsystem via its respective functional read/write path.

14. The method of claim 13, wherein the data packets are re-routed according to a routing table.

15. The method of claim 13, wherein the reading step comprises:
    reading present contents of the at least one data queue of the input queuing subsystem via its respective debug read/write path.

16. The method of claim 9, wherein the predetermined test profile defines the data packets injected into the at least one data queue of the input queuing subsystem and the expected contents of the at least one data queue of the input queuing subsystem after the data packets are received at the input queuing subsystem from the data packet processing environment.

17. The method of claim 16, wherein the determining step comprises:
    comparing the present contents of the at least one data queue of the input queuing subsystem with the expected contents of the at least one data queue of the input queuing subsystem after the data packets are received at the input queuing subsystem from the data packet processing environment as defined in the predetermined test profile.

18. The method of claim 16, wherein the determining step comprises:
    comparing the present contents of the at least one data queue of the input queuing subsystem with the data packets injected into the at least one data queue of the input queuing subsystem as defined in the predetermined test profile.

19. A data packet diagnostic system comprising:

an input queuing subsystem comprising a set of data queues, each coupled with a functional read/write path and a debug read/write path, wherein each data queue receives data via its respective functional read/write path when the input queuing subsystem operates in a functional mode and each data queue receives data via its respective debug read/write path when the input queuing subsystem operates in a test mode;

an injecting unit operable to inject data packets into at least one data queue of the input queuing subsystem via its respective debug read/write path when the input queuing subsystem operates in the test mode;

a switching subsystem operable to re-route the data packets from the input queuing subsystem through a data packet processing environment;

an output queuing subsystem operable to send the data packets to at least one data queue of the input queuing subsystem via its respective functional read/write path; and a diagnostic unit operable to read present contents of at least one data queue of the input queuing subsystem and determine whether the present contents satisfy a predetermined test profile according to the injected data packets.

20. An integrated circuit comprising:

a debug read/write path;

a functional read/write path;

injection circuitry operable to inject data packets into at least one data queue of an input queuing subsystem via the debug read/write path, wherein the at least one data queue is coupled with the functional read/write path and the debug read/write path;

output circuitry operable to release the data packets from the at least one data queue of the input queuing subsystem via its respective functional read/write path into a data packet processing environment in response to receiving a release signal at the queuing subsystem;

input circuitry operable to receive the data packets at the at least one data queue of the input queuing subsystem via its respective functional read/write path when the data packets are processed by the data packet processing environment;

diagnostic circuitry operable to read present contents of the at least one data queue of the input queuing subsystem; and validation circuitry operable to determine whether the present contents satisfy a predetermined test profile according to the injected data packets.

* * * * *

UNITED STATES PATENT AND TRADEMARK OFFICE
CERTIFICATE OF CORRECTION

PATENT NO. : 8,873,421 B2  
APPLICATION NO. : 13/747665  
DATED : October 28, 2014  
INVENTOR(S) : Schulz et al.

Page 1 of 1

It is certified that error appears in the above-identified patent and that said Letters Patent is hereby corrected as shown below:

Title Page, item (56) under Other Publications, line 3, delete "Parrallel" and insert -- Parallel --, therefor.

In the Drawings

On sheet 7 of 7, in figure 7, under Referral Numeral 734, line 4, after "THE" insert -- AT --.

In the Specification

In column 8, line 67, after "the" insert -- at --.

In the Claims

In column 12, line 36, in Claim 13, after "the" insert -- at --.

Signed and Sealed this
Sixteenth Day of June, 2015

Michelle K. Lee
*Director of the United States Patent and Trademark Office*